UNITED STATES PATENT OFFICE.

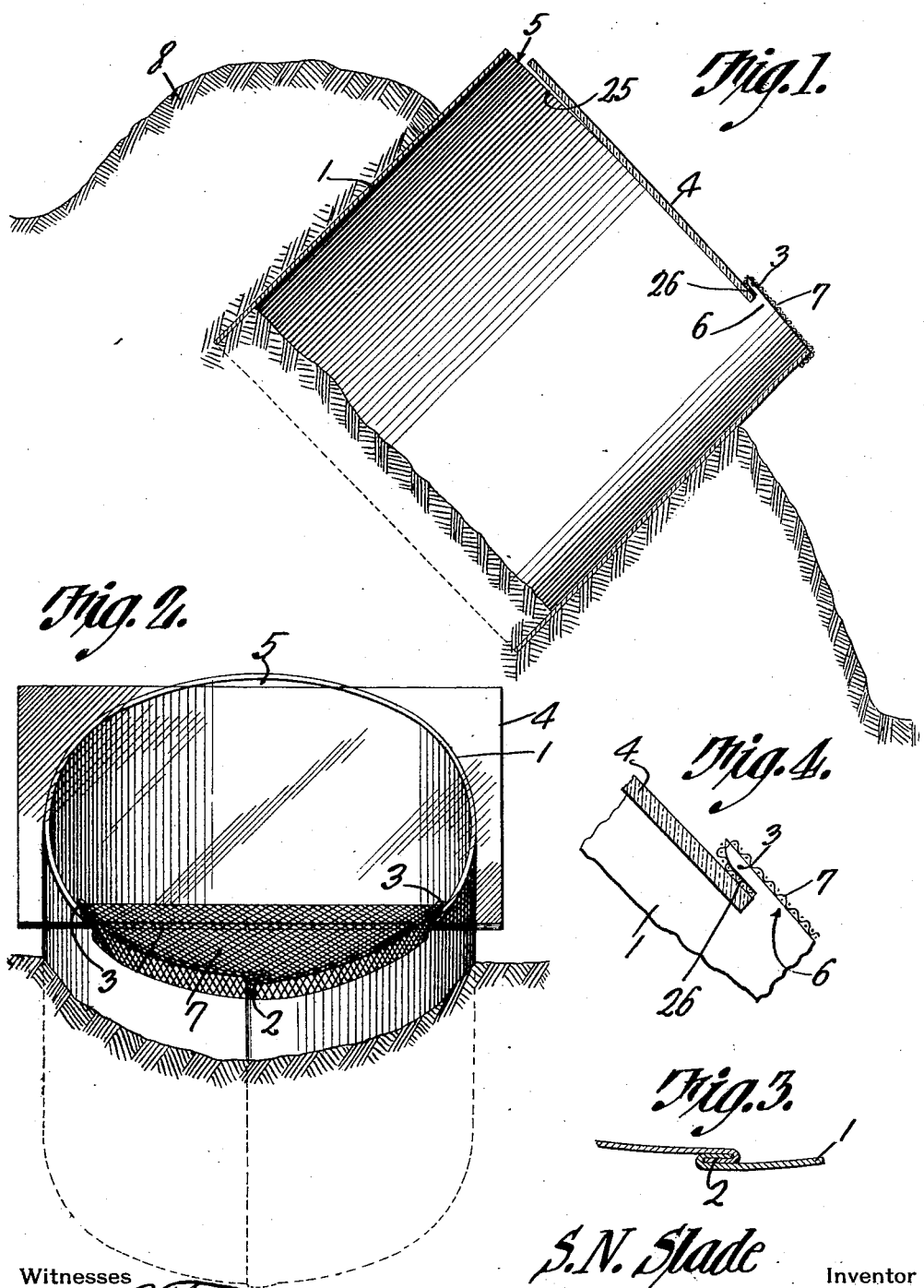

STARKIE NORMAN SLADE, OF DURHAM, NORTH CAROLINA.

PLANT-PROTECTOR.

1,117,265.  Specification of Letters Patent.  Patented Nov. 17, 1914.

Application filed May 12, 1914. Serial No. 838,130.

*To all whom it may concern:*

Be it known that I, STARKIE N. SLADE, a citizen of the United States, residing at Durham, in the county of Durham and State of North Carolina, have invented a new and useful Plant-Protector, of which the following is a specification.

The device forming the subject matter of this application is a plant protector, and the invention aims to provide a device of this type which will afford the necessary ventilation and at the same time keep out insects, killing frosts and worms.

Another object of the invention is to provide a plant protector which may be fashioned at trifling expense, the construction being such that several protectors may readily be nested in U-form when not in use and be stored in small compass.

It is within the scope of the invention to improve generally and to enhance the utility of devices of that type to which the present invention appertains.

With the above and other objects in view which will appear as the description proceeds, the invention resides in the combination and arrangement of parts and in the details of construction hereinafter described and claimed it being understood that changes in the precise embodiment of the invention herein disclosed can be made within the scope of what is claimed without departing from the spirit of the invention.

In the accompanying drawing:— Figure 1 shows the invention in longitudinal section; Fig. 2 is a front elevation; Fig. 3 is an enlarged transverse section taken through the bottom portion of the protector; Fig. 4 is a fragmental section of the protector looking toward the side thereof.

The plant protector herein disclosed preferably is fashioned from a sheet of metal indicated by the reference character 1, the sheet 1 being rolled to form a tube. Along its longitudinal edges, the sheet 1 is equipped with detachably interengaged hook flanges 2, the construction being such that when the protector is not in use, several protectors may readily be nested in U - form, thereby to economize space in storing. On the forward end of the protector, fingers or shoulders 3 are formed. The fingers 3 are spaced from the bottom of the protector. A glass plate 4 is supported by the fingers 3 and is held by the fingers against the mouth of the protector, so that the plate cannot readily be blown off. The width of the plate 4 is less than the diameter of the tube, so that at the top and at the bottom of the tube air openings 5 and 6 exist.

A screen 7, which may be a piece of wire netting, covers the lower air opening 6 and prevents insects from entering. The screen 7 preferably is upheld by being hooked over the fingers 3. The fingers 3, therefore, exercise a double function in that they serve to hold the glass plate 4 in place and serve also as a means for holding the screen 7 in place. Further, because the screen 7 is interengaged with the fingers 3, the screen acts as a brace and tends to prevent the tubular protector from losing its shape, and notably, tends to prevent the interengaged hook flanges 2 from becoming disengaged. Owing to the fact that the openings 5 and 6 exist at the top and at the bottom of the protector, beyond the edges of the glass plate 4, an ample circulation of air is provided for. In this connection it is to be noted that the forward edges of the tube are beveled adjacent the top, as at 25, thus to afford ventilation in a lateral direction. The screen 7 is first mounted on the fingers 3 as shown in Fig. 4 and then the glass plate 4 is mounted in place. The depending lip 26 of the screen which lies to the rear of the fingers 3 aids in holding the plate 4 against displacement.

In applying the protector herein disclosed, a furrow 8 is turned over, and into one side of the furrow 8 the protector is inserted, the protector preferably being disposed at an upward slant of about forty-five degrees with respect to the horizontal and, in this latitude facing toward the south. The seed is planted within the contour of the protector and preferably at a distance of an inch and a half or so from the inner extremity of the protector.

In claiming the invention, the word "bottom" is used to indicate that portion of the tube which appears in section at the right hand side of Fig. 1.

Having thus described the invention, what is claimed is:—

1. A plant protector comprising a tube having shoulders at its end and spaced from the bottom of the tube; and a transparent plate supported on the shoulders, the width of the plate being less than the diameter of the tube to provide air openings adjacent the top and the bottom of the plate and in the end of the tube.

2. A plant protector comprising a tube having shoulders at its mouth and spaced from the bottom of the tube; a transparent plate supported on the shoulders, the width of the plate being less than the diameter of the tube thereby provide air openings at the top and the bottom of the tube; and a screen covering the air opening at the bottom of the tube, the screen being interlocked with the shoulders.

3. A plant protector comprising a tube having shoulders at its mouth and spaced from the bottom of the tube; a transparent plate supported on the shoulders; and a screen covering the space between the lower edge of the plate and the bottom of the tube, the screen being supported on the shoulders.

4. A plant protector comprising a tube having shoulders at its end and spaced from the bottom of the tube; a transparent plate supported on the shoulders and spaced from the bottom of the tube to define a lower air opening, the end edge of the tube being beveled adjacent its top and to the rear of the plate; the shoulders coöperating with the forward face of the plate to hold the rear face of the plate apart from the upper portions of said beveled edges thereby to define upper lateral air openings between the rear face of the plate and the end of the tube.

In testimony that I claim the foregoing as my own, I have hereto affixed my signature in the presence of two witnesses.

STARKIE NORMAN SLADE.

Witnesses:
W. J. BROGDEN,
O. H. CARVER.

Copies of this patent may be obtained for five cents each, by addressing the "Commissioner of Patents, Washington, D. C."